United States Patent [19]

King et al.

[11] 4,009,149
[45] Feb. 22, 1977

[54] AMORPHOUS THERMOPLASTIC AROMATIC POLYSULPHONE

[75] Inventors: Terence King, New Barnet; John Brewster Rose, Letchworth, both of England

[73] Assignee: Imperial Chemical Industries Limited, London, England

[22] Filed: Jan. 17, 1973

[21] Appl. No.: 324,430

[30] Foreign Application Priority Data

Nov. 8, 1972 United Kingdom ............ 51441/72
Dec. 22, 1972 United Kingdom ............ 59313/72

[52] U.S. Cl. ................................. 260/49; 264/331
[51] Int. Cl.² ...................................... C08G 75/23
[58] Field of Search .................... 260/49; 264/331

[56] References Cited

UNITED STATES PATENTS 3,332,909  7/1967  Farnham et al. .................... 260/47
3,647,751  3/1972  Darson .............................. 260/49

Primary Examiner—Lester L. Lee
Attorney, Agent, or Firm—Cushman, Darby & Cushman

[57] ABSTRACT

A novel amorphous thermoplastic aromatic polysulphone is provided consisting of repeating units having the formula

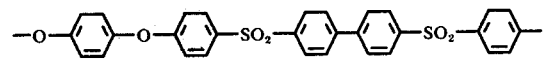

1 Claim, No Drawings

AMORPHOUS THERMOPLASTIC AROMATIC POLYSULPHONE

This invention relates to aromatic polymers and in particular to thermoplastic aromatic polysulphones.

According to the present invention a novel amorphous thermoplastic aromatic polysulphone is provided consisting of repeating units having the formula

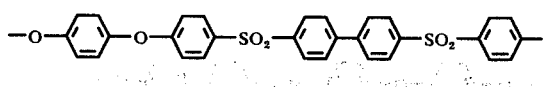

Aromatic polymers and methods for making them are described in British patent specification Nos. 1,016,245; 1,060,546; 1,109,842; 1,122,192 and 1,163,332 which all describe their formation by Friedel-Craft condensation of aryl sulphonyl halides with an aromatic compound with the elimination of hydrogen halide; in British patent specification Nos. 1,078,234; 1,124,200; 1,133,561 and 1,294,982 which all describe their formation by the condensation the dialkali metal salt of a bisphenol with equimolar amount of dihalogenobenzenoid compound having an electron withdrawing group (e.g. —$SO_2$—) ortho or para to the halogen atoms; in British patent specification Nos. 1,153,035 and 1,153,528 which describes their manufacture from the reaction with alkali metal hydroxide of a dihalobenzenoid compound having an electron-withdrawing group (e.g. —$SO_2$) ortho or para to the halogen atoms; in British patent specification Nos. 1,153,035; 1,177,183; 1,234,301 and Dutch patent application No. 70 11346 which describe the condensation of alkali metal salt of a halophenol having an electron-withdrawing group (e.g. —$SO_2$—) ortho or para to the halogen atom with the elimination of alkali metal halide; in Canadian patent specification No. 847,963 and British patent specification No. 1,264,900 which describes the reaction of halophenol and/or bisphenol and dihalobenzenoid compound with alkali metal carbonate, the halophenol and dihalobenzenoid compounds having an electron-withdrawing ortho or para to the halogen atoms. The disclosures of all these specifications are incorporated herein by reference.

The novel polymers of the invention may be made by any of the above routes in which a bisphenol (or dialkali metal salt thereof) is caused to react with a dihalobenzenoid compound; the bisphenol (hydroquinone) having the formula

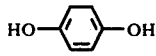

or alkali metal salt thereof preferably potassium or sodium and the dihalobenzenoid compound having formula

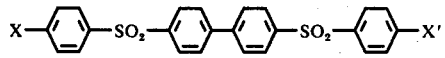

where X and X' are halogen atoms, preferably the same and preferably chlorine or fluorine.

It has been found surprisingly that the polymer of the present invention is amorphous with a Tg of about 260° C whereas polymer having repeating units of

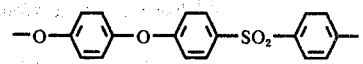

is said to be crystalline with a Tm of 310° C (R N Johnson et al J. Polymer Science, A1, 1967, volume 5 pages 2375 to 2398 at page 2394). Whilst therefore the thermoplastic polymer of the invention may be used for any of the applications known for thermoplastic polysulphones, they are particularly useful in end uses where high temperatures are expected for example, cable insulation, wire coating, capacitor dielectrics and insulants, electrical connector and switch gear parts, printed circuit components, engine bearing cages and shaped articles in proximity to engines and motors.

The invention is illustrated by the following Example.

Hydroquinone (11.011 g; 0.10 mole), bis[4-(4-chlorophenyl sulphonyl)] biphenyl (50.344 g; 0.100 mole; II, X = X' = chlorine), dimethyl sulphoxide (200 cm³) and toluene (75 cm³) were charged to a flask (capacity 500 cm³) fitted with a thermometer, stirrer, nitrogen purge and a Dean and Starke apparatus [fitted on a column 30 cm high and 2.5 cm diameter packed with glass latices] provided with a condenser. After purging the mixture for 30 minutes with nitrogen, potassium carbonate (anhydrous; 27.9 g; 0.202 mole) was added and after a further 15 minutes purging, the mixture was heated to 140° C. Some toluene was removed by distillation to raise the temperature to 150° C. After 2.5 hours at 150° to 156° C, the viscous mixture was cooled to 140° C and methyl chloride passed through the mixture for 45 minutes. The mixture was cooled and macerated with methanol. The polymer was boiled with methanol (three times), water (three times) and methanol/acetone (1:1 v/v). The polymer was dried in vacuo at 140° C. The polymer had a reduced viscosity of 0.56 as measured at 25° C on a solution of the polymer in dimethyl sulphoxide containing 1 g of polymer in 100 cm³ of solution. A film compression-moulded from a sample of the polymer was tough but was generally cloudy. The polymer was purified by dissolving in dimethyl sulphoxide (450 cm³) filtering through a glass sinter and precipitating with methanol in a macerator. The polymer was boiled with methanol (3 times) and water (3 times) and dried in vacuo at 140° C. The polymer was compression-moulded at 330° C for 3 minutes at a pressure of 0.8 tons per square inch (12.5 MN/m²) into a film which was clear and tough. The film dissolved in methylene chloride to give a turbid solution. The polymer was amorphous to X-rays, had a Tg of about 260° infra red and nuclear magnetic resonance spectra consistent with its having the formula

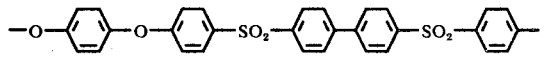

Specimens for impact testing were made by compression-moulding layers of the above film at 330° C for 3 minutes at a pressure of 12.5 MN/n² to give the required thickness. The notched impact strength was 64.5 kJ/m² and after ageing specimens in air for 7 days at 150° C the notched impact strength was 57.4 kJ/m².

Similar film was also compression-moulded at temperatures of 300° C to 400° C; temperatures up to 450° C could be used but mouldings darkened and degraded rapidly at 450° C. Samples of polymer compression-moulded at 280° C had not flowed sufficiently to give a coherent film.

In the notched impact strength test, carried out at 20° C, a specimen 51 mm long, 6.3 mm wide and 3 mm thick was given a 45° notch 2.8 mm deep (tip radius 2.0 mm) in the centre of one edge. It was supported between two supports 38 mm apart and struck centrally on the edge opposite the notch by a pendulum dropping from 305 mm with more than sufficient energy to break the specimen. From the residual energy of the pendulum, the energy required to break the specimen was calculated and divided by the cross-sectional area of the specimen at the notch. The resulting value (expressed in kJ/m²) represents the energy required to break the material. Further specimens were aged at 150° C for 7 days in air.

The Tg was measured by Differential Scanning Calorimetry on reheating a sample of polymer at 16° C per minute, which had previously been heated to 290° C by raising its temperature at 16° C per minute followed by cooling to about 25° C at 64° C per minute.

We claim:

1. An amorphous thermoplastic aromatic polysulphone consisting of repeating units having the formula

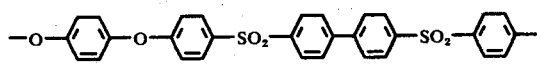

and having a Tg of about 260° C.

* * * * *